UNITED STATES PATENT OFFICE.

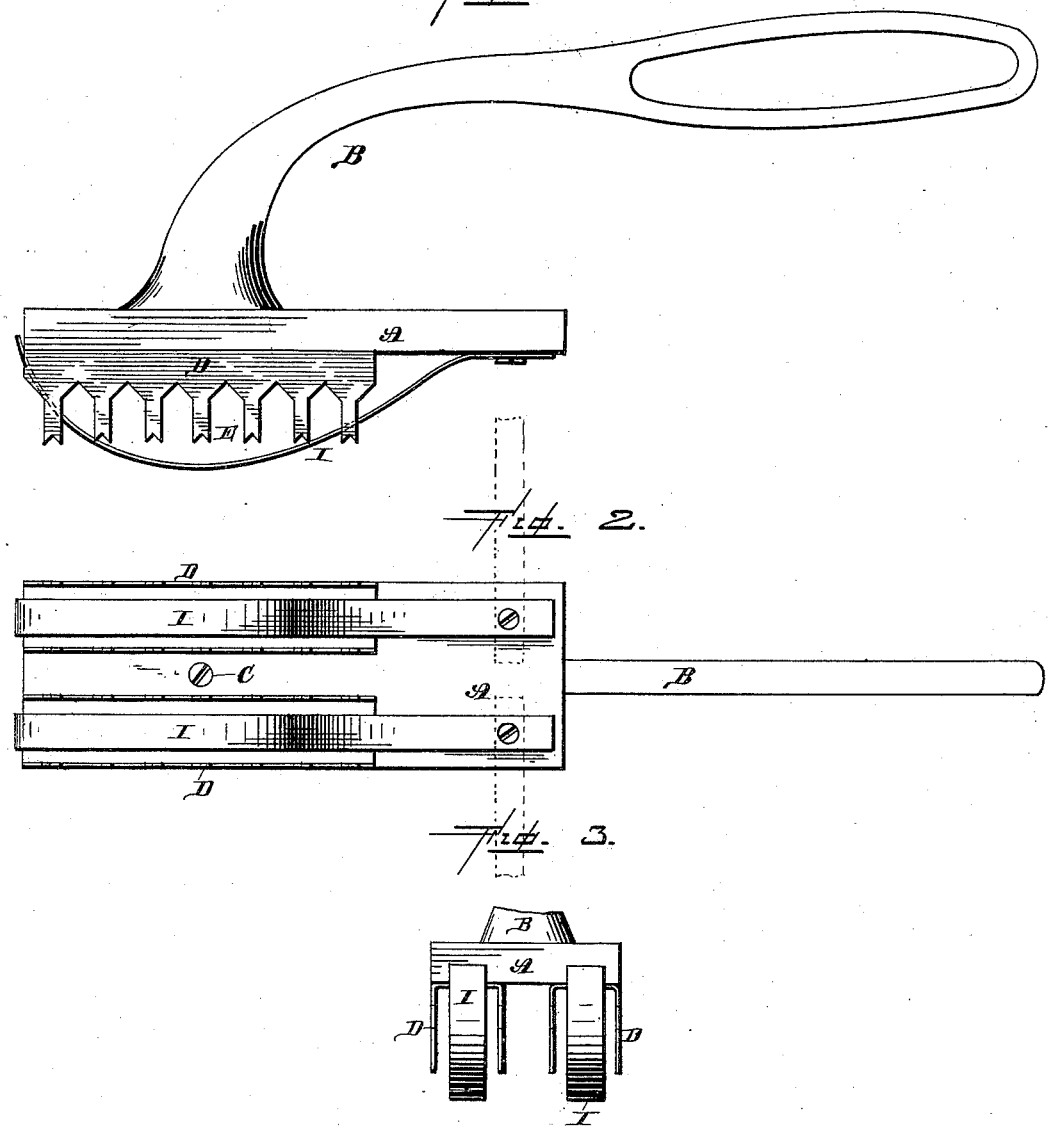

LEVI STONE, OF ST. MARY'S, OHIO, ASSIGNOR OF ONE-HALF TO ELIJAH STONE, OF CHICAGO, ILLINOIS.

MEAT-TENDERER.

SPECIFICATION forming part of Letters Patent No. 311,451, dated January 27, 1885.

Application filed March 28, 1884. (No model.)

*To all whom it may concern:*

Be it known that I, LEVI STONE, of St. Mary's, in the county of Auglaize and State of Ohio, have invented certain new and useful Improvements in Devices for Tendering Beefsteak; and I do hereby declare the following to be a full, clear, and exact description of the invention, such as will enable others skilled in the art to which it pertains to make and use it, reference being had to the accompanying drawings, which form part of this specification.

My invention relates to an improvement in devices for tendering beefsteaks; and it consists in the combination of the main plate or frame, the steel plates provided with sharp cutting-points, and which are bent into a suitable shape and then secured to the frame, and the curved flat springs which are placed between the points of the cutting-plates, and which are adapted to be swung around to one side when the implement is being cleaned, all of which will be more fully described hereinafter.

The object of my invention is to provide a beefsteak-tenderer with removable plates having cutting-points, and with springs which can be freely swung around out of the way, so as to allow the cutting-points to be readily and thoroughly cleaned.

Figure 1 is a side elevation of an implement embodying my invention. Fig. 2 is an inverted view. Fig. 3 is an end view.

A represents a suitable iron plate, which will be of any desired length and width, and to which the handle B is cast, or secured by means of the screw C, or by any other suitable fastening device. To the under side of this plate A are secured the cutting-plates D, which are bent into a U shape, and then fastened in position by means of screws or other fastening devices. Each one of these cutting-plates has its edges formed into a series of cutting-teeth, E, which teeth are recessed at their lower ends, so as to form two sharp cutting-points. In striking pieces of meat the teeth are often broken and injured by coming in forcible contact with pieces of bone or other hard substance, and hence it becomes necessary to make the cutting-plates removable, so that they can be readily repaired in case of injury or dulling of the teeth, and a new one can be substituted in case of a breakage. For this reason the cutting-plates are made removable from the plate A, and for the further reason that the part A can be made of much cheaper material than the cutting-plates, and hence the implement can be produced more cheaply than if all of the parts were made of steel, like the plates.

In order to prevent the steak from sticking to the points of the cutting-plates, the pivoted bent springs I are used. These springs extend along between each row of sharp cutting-points, and, being made to project down below the points of the teeth, they serve to force the steak outward and away from the teeth as soon as the springs are left free to act. When the steak is struck with the implement, the springs are compressed or flattened to the depth to which the sharp cutting-points enter the steak, and as soon as the force of the blow is expended the springs react and force the meat away from the points.

As it becomes necessary to clean the implement very frequently, and as it would be impossible to do so thoroughly and easily with the springs in between the points, each one of the springs is pivoted to the plate, so that it can be swung around to one side, as shown in dotted lines, and thus leave the cutting-plates free to be thoroughly cleaned, or to be removed from the plate A, as may be desired.

Having thus described my invention, I claim—

The combination of the plate A, provided with a handle, the U-shaped steel cutting-plates D, fastened to the under side of the plate A, and the springs I, which are adapted to be turned at an angle to the cutting-plates, substantially as set forth.

In testimony whereof I affix my signature in presence of two witnesses.

LEVI STONE.

Witnesses:
T. J. ARMSTRONG,
WALTER N. MOTT.